(12) United States Patent
Oinonen

(10) Patent No.: US 10,501,120 B2
(45) Date of Patent: Dec. 10, 2019

(54) DRIVE ARRANGEMENT IN A VEHICLE

(71) Applicant: DEERE & COMPANY, Moline, IL (US)

(72) Inventor: Turo Oinonen, Tampere (FI)

(73) Assignee: DEERE & COMPANY, Moline, IL (US)

(*) Notice: Subject to any disclaimer, the term of this patent is extended or adjusted under 35 U.S.C. 154(b) by 36 days.

(21) Appl. No.: 15/997,035

(22) Filed: Jun. 4, 2018

(65) Prior Publication Data

US 2018/0346023 A1 Dec. 6, 2018

(30) Foreign Application Priority Data

May 31, 2017 (EP) ..................... 17173682

(51) Int. Cl.
| | |
|---|---|
| *B62D 11/18* | (2006.01) |
| *B62D 5/28* | (2006.01) |
| *B62D 12/02* | (2006.01) |
| *B62D 55/065* | (2006.01) |
| *B60K 1/02* | (2006.01) |
| *F16H 3/72* | (2006.01) |
| *F16H 48/06* | (2006.01) |

(52) U.S. Cl.
CPC .......... *B62D 11/183* (2013.01); *B62D 5/28* (2013.01); *B62D 12/02* (2013.01); *B62D 55/0655* (2013.01); *B60K 1/02* (2013.01); *F16H 3/728* (2013.01); *F16H 48/06* (2013.01)

(58) Field of Classification Search
None
See application file for complete search history.

(56) References Cited

U.S. PATENT DOCUMENTS

| | | | | |
|---|---|---|---|---|
| 4,157,125 A | * | 6/1979 | Bushell | B60K 17/356 180/212 |
| 5,921,335 A | * | 7/1999 | Straetker | B62D 11/183 180/6.44 |
| 6,725,954 B1 | * | 4/2004 | Keane | B62D 11/12 180/6.48 |
| 2004/0204278 A1 | | 10/2004 | Olsson | |
| 2004/0226760 A1 | | 11/2004 | Loh | |
| 2009/0038186 A1 | * | 2/2009 | Osswald | B62D 21/14 37/413 |

FOREIGN PATENT DOCUMENTS

JP S60132979 U 9/1985

OTHER PUBLICATIONS

European Search Report issued in counterpart application No. 17173682.0 dated Dec. 6, 2017 (8 pages).

* cited by examiner

*Primary Examiner* — Colby M Hansen

(57) ABSTRACT

A drive arrangement in a vehicle having front and rear ground engaging means and steering means, has a differential transmission, a differential lock, a planetary final drive on each side of the vehicle and a motor acting onto one member of the planetary final drives. The motor is controlled depending on the steering angle such, that it provides for a difference in the drive speed on the left and the right side.

7 Claims, 2 Drawing Sheets

DRIVE ARRANGEMENT IN A VEHICLE

RELATED APPLICATIONS

This application claims priority to European Patent Application Ser. No. 17173682.0, filed 31 May 2017, the disclosure of which is hereby expressly incorporated by reference in its entirety.

FIELD OF THE DISCLOSURE

The present disclosure relates to a drive arrangement in a vehicle having front and rear ground engaging means and steering means, whereas the drive arrangement for the front and/or rear ground engaging means comprises a differential transmission, a differential lock, and a planetary final drive on each side of the vehicle.

BACKGROUND OF THE DISCLOSURE

U.S. Pat. No. 8,082,088 discloses an articulated vehicle with a drive for front and rear wheels, whereas hydraulic motors are connected to planetary final drives of the front wheels, such that the slippage remains under control, whereas a mechanical lock is avoided. Locking happens via the control of the hydraulic motors. However, it may be inefficient to use two hydraulic motors all the time, even under normal circumstances.

SUMMARY OF THE DISCLOSURE

In one embodiment a very efficient mechanical differential lock can be used at any time, even in curves. The motor is used to provide for different drive speeds at the left and the right side only when driving through a curve. Whether one or more motors is used may depend on many variables, like the available space, the required driving force, difficulties of control, etc. The mechanical differential lock may be of the jaw type as well as of the disk type. The lock ensures that the ground engaging means on both sides rotate with the same speed when driving straight. The front and rear ground engaging means need not to be similar, but can be of different types, and cause the vehicle to turn in a circle. The ground engaging means may be wheels, tracks, tracks around wheels, or any similar rotating device. The vehicle may be an agricultural, industrial or forestry vehicle, like a tractor, a wheel loader, a forwarder, a harvester, a skidder, etc. The dependency on the steering angle may happen through a steering angle captured from the actual position of the wheels, linkage, chassis parts, etc. but also from the signals used to initiate the steering. The signals may be direct or modified and may cause the inner and the outer ground engaging means on the turning radius to drive exactly at the right speed at the ideal inner and outer line or provide for a slight under or oversteer. The planetary final drive may be located close to the differential transmission, close to the ground engaging means, or at any place in between.

As the ring wheel of the planetary final drive needs the least power to be rotated, applying the motor there is most beneficial, since a small motor is sufficient. Yet, this is just an advantage. Alternatively, the motor may also act onto the planet carrier or on the sun gear. The connection may happen in various ways (via one or more mechanical gears, belts, chains or in any other way).

While hydraulic energy is normally available on all vehicles, motors more and more may also be driven electrically. It is important, that the motor not only provides for motion, but is also able to keep the element of the planetary final drive stationary, if need be via separate brakes.

Planetary final drives can also be driven by the main engine of the machine via a mechanical transmission with one or more fixed gear ratios or an infinitely variable gear ratio.

When driving through a curve, the rotation of the inner ground engaging means needs to be slowed down, whereas that of the outer ground engaging means needs to be accelerated, the respective elements of the planetary final drive need to be rotated in opposite directions. Such inverse movement may be achieved via gears and counter gears, by letting one drive gear mesh with an inner gear on the ring wheel and another drive gear with an outer gear on the ring wheel or also by using two motors, one per planetary final gear. Both motors may be fed by the same pump and controlled via one or more proportional valves getting signals depending on the true or intended steering angle. Motors can be driven also with a closed circuit hydraulic system where pump oil flow and thus rotational speed of the motors is controlled.

Steering means acting on an articulated joint between a front and a rear part of the vehicle are used mainly on big tractors, wheel loader and forestry vehicles. But this disclosure is also useful for vehicles with ordinary steering turning front or rear ground engaging means, like wheels.

The drive of the present disclosure is particularly advantageous when ground engaging means do not touch the ground at a single spot, but over a distance, like when the front and/or rear ground engaging means comprise a bogie carrying wheels spaced in the driving directions with or without tracks wrapped around. Over or understeering in such cases has a strong impact on the soil.

To ensure that the motors are driven only when needed, a control device is provided, which receives signals from the steering means and the differential lock and emits a signal to the motor(s). In this case it is recognized, when the differential lock is engaged and the vehicle is driven on a radius nevertheless. Engagement of differential lock can also be sensed from the signal of the differential lock operating switch in the operator station.

Other features and aspects will become apparent by consideration of the detailed description and accompanying drawings.

BRIEF DESCRIPTION OF THE DRAWINGS

In the following one embodiment of the invention is described in more detail and in relation to the drawing. It is shown in.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments may include any combination of features from one or more dependent claims, and such features may be incorporated, collectively or separately, into any independent claim.

DETAILED DESCRIPTION

Figure 1:
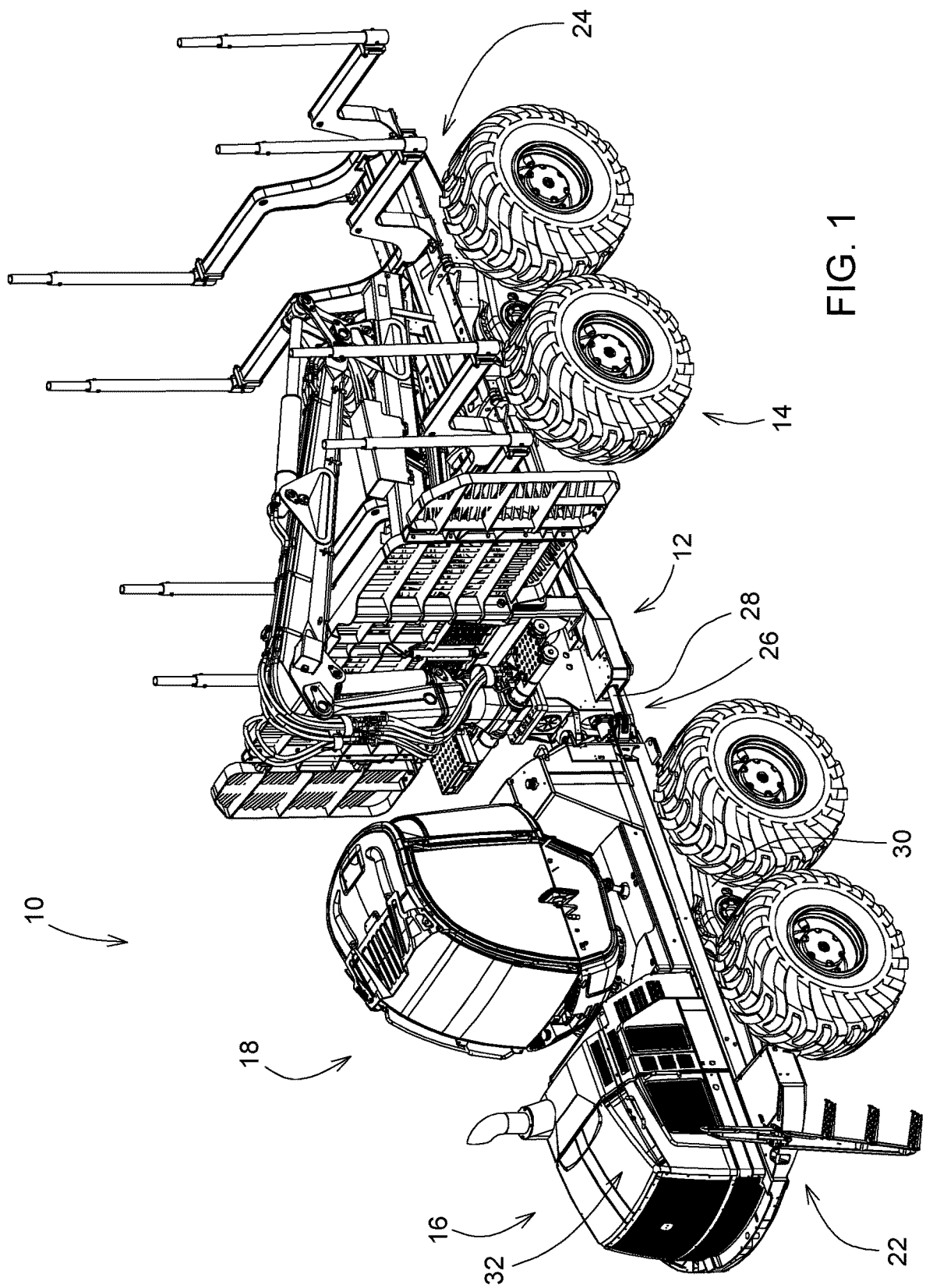
FIG. 1 is a perspective view of a vehicle according to one embodiment.
Figure 2:
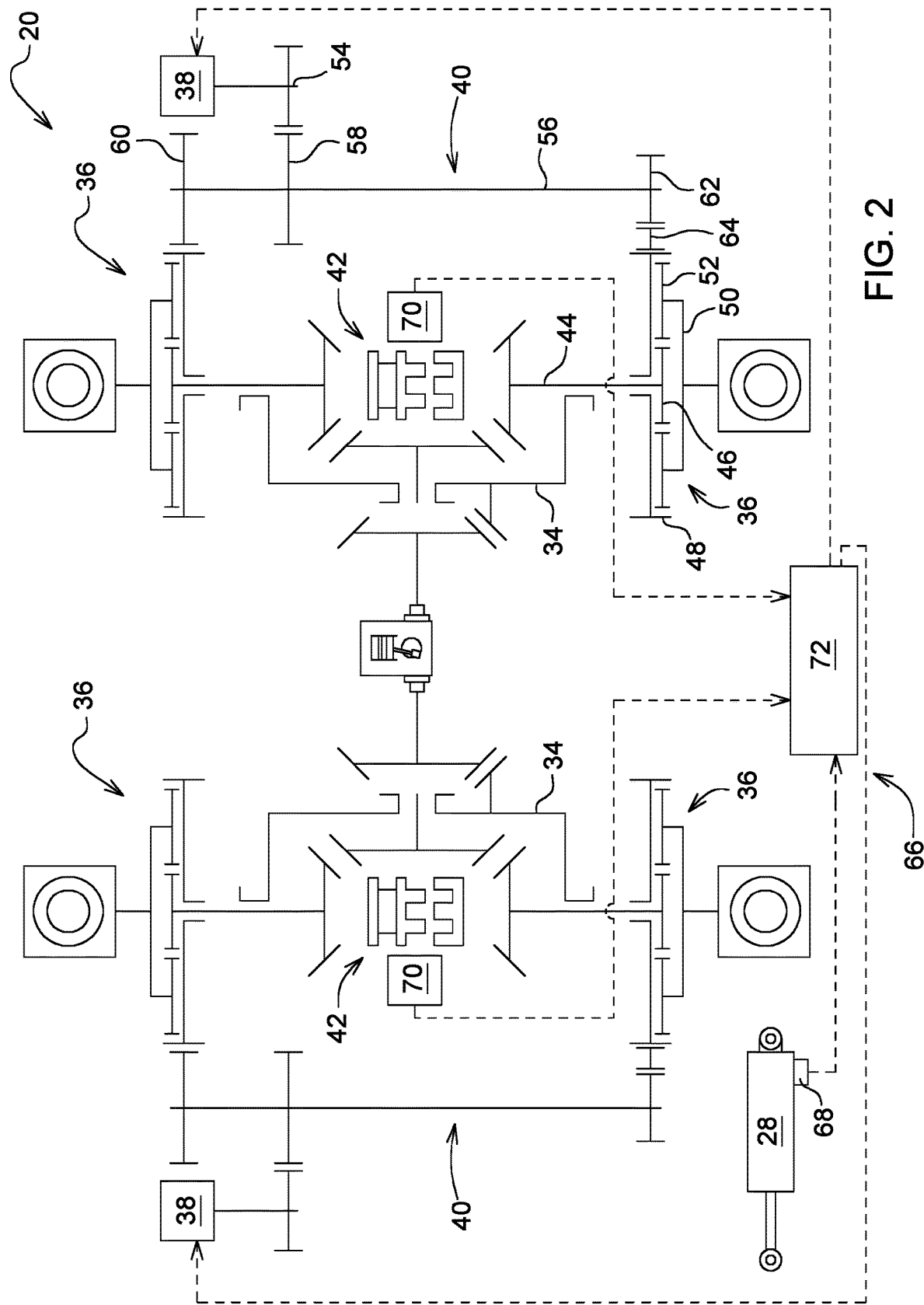
FIG. 2 a schematic of a drive arrangement of the vehicle of FIG. 1.

A vehicle 10 shown in FIG. 1 has a chassis 12, ground engaging means 14, an engine compartment 16, an operator station 18 and a drive arrangement 20 (FIG. 2).

The vehicle 10 is shown as a forwarder, used in forestry to carry logs out of the forest, but could be any other kind of vehicle 10 described above.

The chassis 12 comprises a front part 22 and a rear part 24, which are pivotally connected at their facing ends by means of a joint 26 having a vertical and horizontal pivot axis, as this is known in the art. Between the front and the rear part 24 are provided steering means 28 in the form of linear hydraulic motors, which are controlled from a steering wheel or lever (not shown) in the operator station 18 and which change the relative position between the front and rear parts 22, 24.

The ground engaging means 14 are shown as wheels arranged as a tandem, whereas each pair is borne by a bogie 30 vertically pivotably connected to the front or rear part 22, 24. The bogies 30 are not steerable and steel or rubber tracks could be routed around the ground engaging means 14. At least one ground engaging means 14 per bogie 30 is driven. Bogies 30 are not necessary. Alternatively, there could be one wheel per side and the front or rear part 22, 24 could be suspended individually or a common axle is contemplated as well.

The engine compartment 16 is provided on the front part 22 and comprises besides an engine 32 all means needed for mechanical, hydraulic and electric drive.

The operator station 18 is likewise provided on the front part 22 and may be of the fixed, tiltable and/or rotatable kind.

The drive arrangement 20 is shown as a schematic in FIG. 2 and comprises the elements needed to transfer the power from the engine 32 to the ground engaging means 14. Such elements include a differential transmission 34 for each of the front and rear parts 22, 24 of the chassis 12, planetary final drives 36 for each group of ground engaging means 14, i.e. per bogie 30, motors 38 per differential transmission 34, a drive line 40 between the motors 38 and the planetary final drives 36 and a differential lock 42 per differential transmission 34.

The differential transmissions 34 are of the well-known kind with a rotating housing and inner meshing wheels driving output shafts 44 per side of the vehicle 10, each bearing or connected to a sun gear 46 of the planetary final drives 36. The differential lock 42 is able to connect the two output shafts 44 rotationally, such that they rotate in common.

The planetary final drives 36 each have a ring wheel 48 and a planet carrier 50 besides the sun gear 46. The planet carrier 50 is rotationally connected to the ground engaging means 14, whereas the ring wheel 48 is kept on planets 52 rotating on the planet carrier 50. The rotation transferred via the planetary final drives 36 thus depends on the behavior of the ring wheel 48, which in an ideal situation is stationary.

The motors 38 are in the form of hydraulic motors with an output shaft 54. The motors 38 are able to be blocked against rotation if needed.

The drive line 40 comprises a drive shaft 56 with an input gear 58, a left output gear 60 and a right output gear 62, each rotationally fix with the drive shaft 56. Obviously it does not matter, on which side the idler wheel 64 is located and thus "left" and "right" only serve for the purpose of distinction. The input gear 58 meshes with the output shaft 54 of the motor 38, the left output gear 60 meshes with the left ring wheel 48 and the right output gear 62 meshes with an idler wheel 64, which itself meshes with the right ring wheel 48, thereby inversing the direction.

It is to be noted, that FIG. 2 is a schematic view of the drive arrangement 20 and thus, the dimension, locations, etc. of its individual elements are for representation only, rather than chosen for true design.

Finally, a control device 66 is provided, which includes a steering sensor 68 at the steering means 28, a sensor 70 at the differential lock 42 and a controller 72 generating an output signal from the input received from sensors 68 and 70 to control the motors 38.

Based on this structural description the drive arrangement 20 acts as follows.

In an ordinary operation the differential locks 42 are disengaged and the ground engaging means 14 on both sides may rotate at different speeds. In this scenario the motors 38 are rotationally fix and keep the ring wheel 48 against rotation.

In a case, in which the differential locks 42 need to be engaged and the machine has to be turned, (e.g. when following a turning radius on soft and muddy soil on one side of the vehicle 10) the controller 72 learns from the sensor 70, that the differential locks 42 are closed and from the steering sensor 68 how big the turning radius is. Based on this information the controller 72 calculates what the difference in drive speed between the ground engaging means 14 on the left and on the right side need to be and sends a signal to the motors 38 or associated valves to adjust to the speed. This output speed of the motors 38 in any case will be minimal and only provides for the difference. The rotating motors 38 then drive the drive shaft 56 and the right ring wheel 48 in one direction and the left ring wheel 48 via the idler wheel 64 in the other direction. As a result the planet carriers 50, the sun gears 46 and the ground engaging means 14 on the left and the right side will rotate at slightly different speeds adjusted to the different turning radii.

The invention claimed is:

1. A drive arrangement in a vehicle having front and rear ground engaging means and steering means, wherein the drive arrangement for at least one of the front and rear ground engaging means comprises a differential transmission, a differential lock, a planetary final drive on each side of the vehicle and a motor acting onto one member of the planetary final drives depending on the steering angle and in inverse direction.

2. The drive arrangement according to claim 1, wherein the motor acts on a ring wheel of the planetary final drives.

3. The drive arrangement according to claim 1, wherein the motor is at least one of a hydraulic motor and an electric motor.

4. The drive arrangement according to claim 1, wherein at least one of one motor acts on several planetary final drives via a counter rotating idler wheel and on each side one motor acts on one planetary final drive.

5. The drive arrangement according to claim 1, wherein the steering means acts on at least one of an articulated joint between a front and a rear part of the vehicle, on the front ground engaging means, and on the rear ground engaging means.

6. The drive arrangement according to claim 1, wherein at least one of the front ground engaging means and the rear ground engaging means comprises a bogie carrying wheels spaced in a driving direction.

7. The drive arrangement according to claim 1, wherein a control device receives signals from a steering sensor at the steering means and a sensor at the differential lock and emits a signal to the motor.

\* \* \* \* \*